United States Patent [19]

Meaney et al.

[11] Patent Number: 5,564,062
[45] Date of Patent: Oct. 8, 1996

[54] RESOURCE ARBITRATION SYSTEM WITH RESOURCE CHECKING AND LOCKOUT AVOIDANCE

[75] Inventors: Patrick J. Meaney; Pak-kin Mak, both of Poughkeepsie, N.Y.

[73] Assignee: International Business Machines Corporation, Armonk, N.Y.

[21] Appl. No.: 414,548

[22] Filed: Mar. 31, 1995

[51] Int. Cl.⁶ .................................................. G06F 13/364
[52] U.S. Cl. ....................... 395/732; 395/291; 364/242.6; 364/242.7; 364/242.8; 364/242.93; 364/281.3; 364/281.6; 364/DIG. 1
[58] Field of Search ...................................... 395/729, 650, 395/474, 732, 200.08, 726, 291; 370/85.4

[56] References Cited

U.S. PATENT DOCUMENTS

| | | | |
|---|---|---|---|
| 4,136,386 | 1/1979 | Annunziata et al. | 395/446 |
| 4,464,749 | 8/1984 | Ulug | 370/85.4 |
| 4,646,232 | 2/1987 | Chang et al. | 395/293 |
| 4,672,536 | 6/1987 | Giroir et al. | 395/729 |
| 4,752,872 | 6/1988 | Ballatore et al. | 395/298 |
| 4,796,178 | 1/1989 | Jennings et al. | 395/650 |
| 5,133,059 | 7/1992 | Ziegler et al. | 395/467 |
| 5,133,074 | 7/1992 | Chou | 395/473 |
| 5,210,871 | 5/1993 | Lala et al. | 395/650 |
| 5,222,223 | 6/1993 | Webb, Jr. et al. | 395/467 |
| 5,226,143 | 7/1993 | Baird et al. | 395/472 |
| 5,239,651 | 8/1993 | Sodos | 395/729 |
| 5,276,848 | 1/1994 | Gallagher et al. | 395/448 |
| 5,293,496 | 3/1994 | White et al. | 395/288 |
| 5,293,621 | 3/1994 | White et al. | 395/650 |
| 5,307,348 | 4/1994 | Buchholz et al. | 370/85.2 |
| 5,353,416 | 10/1994 | Olson | 395/288 |
| 5,377,332 | 12/1994 | Entwistle et al. | 395/297 |

Primary Examiner—Gopal C. Ray
Attorney, Agent, or Firm—Lynn L. Augspurger; Andrew M. Riddles

[57] ABSTRACT

A resource arbitration system is provided implementing a modified round robin priority selection logic including resource checking and lockout avoidance that updates the round robin priority token only when (1) the process request is granted and (2) there are no prior processes with resource conflicts. The resource arbitration system thereby allows each process request to get into the queue with high priority once the requested resource is freed.

9 Claims, 4 Drawing Sheets

RESOURCE ARBITRATION SYSTEM WITH RESOURCE CHECKING AND LOCKOUT AVOIDANCE

BACKGROUND OF THE INVENTION

The present invention is directed to resource arbitration for hardware systems. More particularly, the present invention is directed to resource arbitration using round robin priority selection logic.

In hardware systems, e.g., computer systems, it is often advantageous to use a round robin scheme for resolving conflicts in priority queues. U.S. Pat. No. 5,377,332 to Entwistle et al. shows an apparatus for arbitrating the use of a system bus that includes such a round robin scheme. The round robin scheme gives a reasonably "fair" treatment of all process requests in the queue. In such systems, the round robin priority token is updated when a process request is granted priority to the queue.

FIG. 1 illustrates operation of round robin priority logic in accordance with the prior art. In cycle 0, Process P1 (Task 1) is selected busying Resource A in cycles 2 and 3. The priority token is then updated to point to P1.

In cycle 1, Process Pr (Task 2) is selected, is found to have a conflict with Resource A in cycle 2, and is therefore rejected. The priority token is updated to point to Pr.

In cycle 2, Process Pn (Task 3) is selected and no conflict is found for Resource B in cycle 3. The priority token is updated to point to Pn.

In cycle 3, Process P2 (Task 4) is selected and, as no conflict is found for Resource A in cycle 4, Resource A is busied in cycles 5 and 6. The priority token is then updated to point to P2.

In cycle 4, Process Pr (Task 2) is selected, is found to have a conflict with Resource A in cycle 5, and is therefore rejected. The priority token is updated to point to Pr.

In cycle 5, Process Pn (Task 5) is selected and no conflict is found for Resource B in cycle 6. The priority token is updated to point to Pn.

In cycle 6, Process P2 (Task 6) is selected and, as no conflict is found for Resource A in cycle 7, Resource A is busied in cycles 8 and 9. The priority token is updated to point to P2.

In cycle 7, Process Pr (Task 2) is selected, is found to have a conflict with Resource A in cycle 8, and is therefore rejected. The priority token is updated to point to Pr.

In cycle 8, Process Pn (Task 7) is selected and no conflict is found for Resource B in cycle 9. The priority token is updated to point to Pn.

It may be appreciated that there are times when allowing a particular process request into the queue will have an adverse affect on system performance. For example, a resource that is needed by a particular process may be tied up and allowing that process request to proceed might cause future rejects or system hangs. In FIG. 1, this is illustrated by Task 2, which keeps getting rejected. This reject causes resources A and B to have periodic idle cycles.

Accordingly, there is a need in the art for a method and apparatus for resource arbitration that insures the availability of requested resources prior to granting priority to a process request. Additionally, there is a need in the art for a method and apparatus for resource arbitration that insures that a process is not continually preempted due to a resource conflict resulting in an indefinite lockout of the process request.

SUMMARY OF THE INVENTION

With the foregoing in mind, it is an object of the invention to provide a method and apparatus for resource arbitration providing improved priority selection based on resource contention while avoiding lockout problems.

In accordance with the invention, there is provided a method and apparatus for resource arbitration that insures the availability of requested resources prior to granting priority to a process request. Additionally, there is provided a method and apparatus for resource arbitration that insures that a process is not continually preempted due to a resource conflict resulting in an indefinite lockout of the process request.

The invention implements a modified round robin logic that updates the round robin priority token only when the process request is granted and there are no higher priority processes with resource conflicts. This allows each process request to get into the queue with high priority once the requested resource is freed.

The modified round robin logic with resource checking and lockout avoidance in accordance with the invention provides improved system performance by allowing the resource arbitration logic to handle process requests with a higher probability of success, resulting in less rejects and increased system throughput.

BRIEF DESCRIPTION OF THE DRAWINGS

The accompanying drawings, referred to herein and constituting a part hereof, illustrate preferred embodiments of the invention and, together with the description, serve to explain the principles of the invention, wherein.

DETAILED DESCRIPTION OF THE DRAWINGS

In accordance with the invention, a modified round robin priority selection logic is implemented that updates the round robin priority token only when (1) the process request is granted and (2) there are no prior processes with resource conflicts:

| Highest Request | Highest Non-Blocked Request | Grant | Token Adjust |
|---|---|---|---|
| — | — | — | No Change |
| A | — | — | No Change |
| A | A | A | Move To A |
| A | B | B | No Change |

Figure 1:
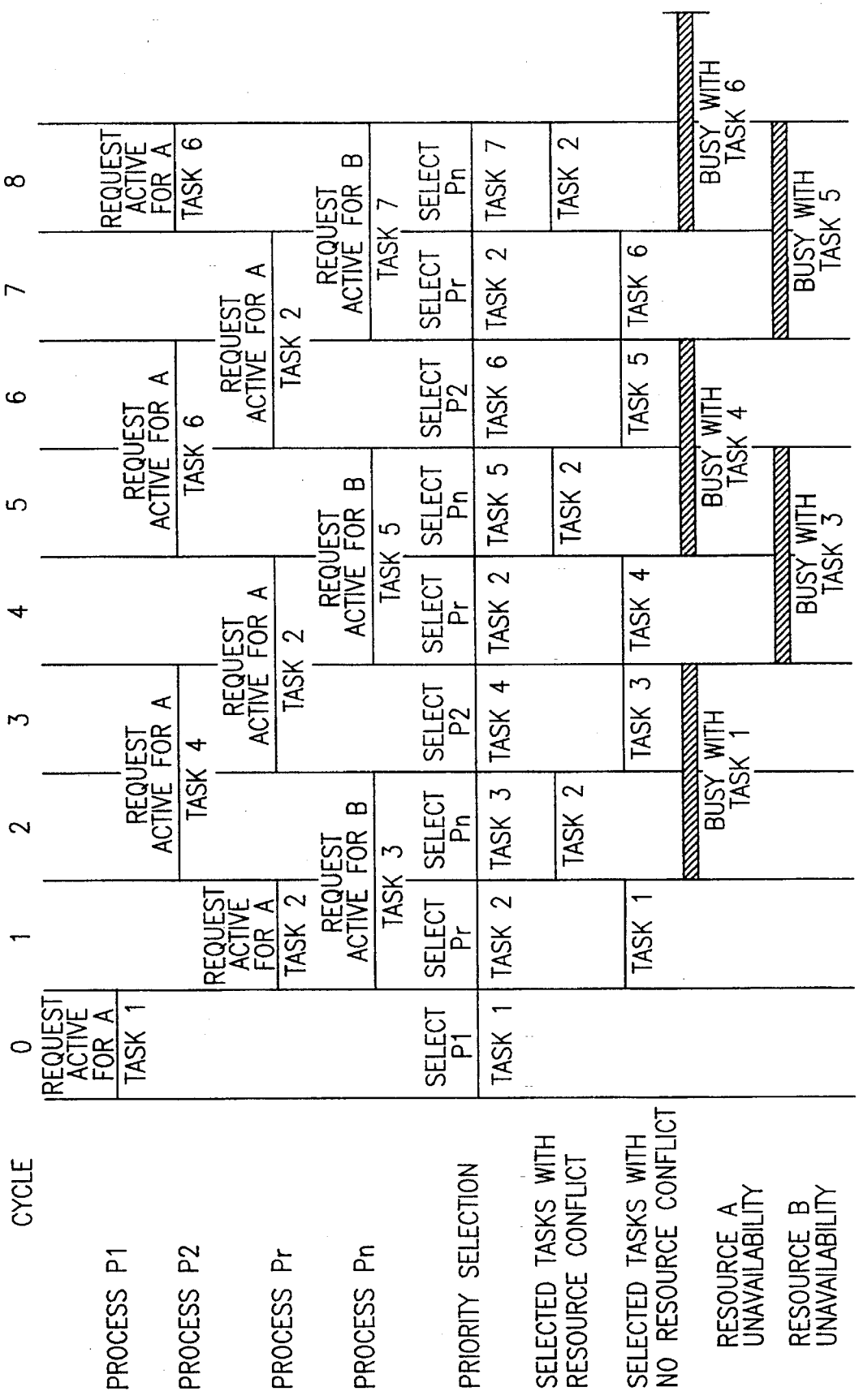
FIG. 1 illustrates operation of round robin priority selection logic in accordance with the prior art.
Figure 2:
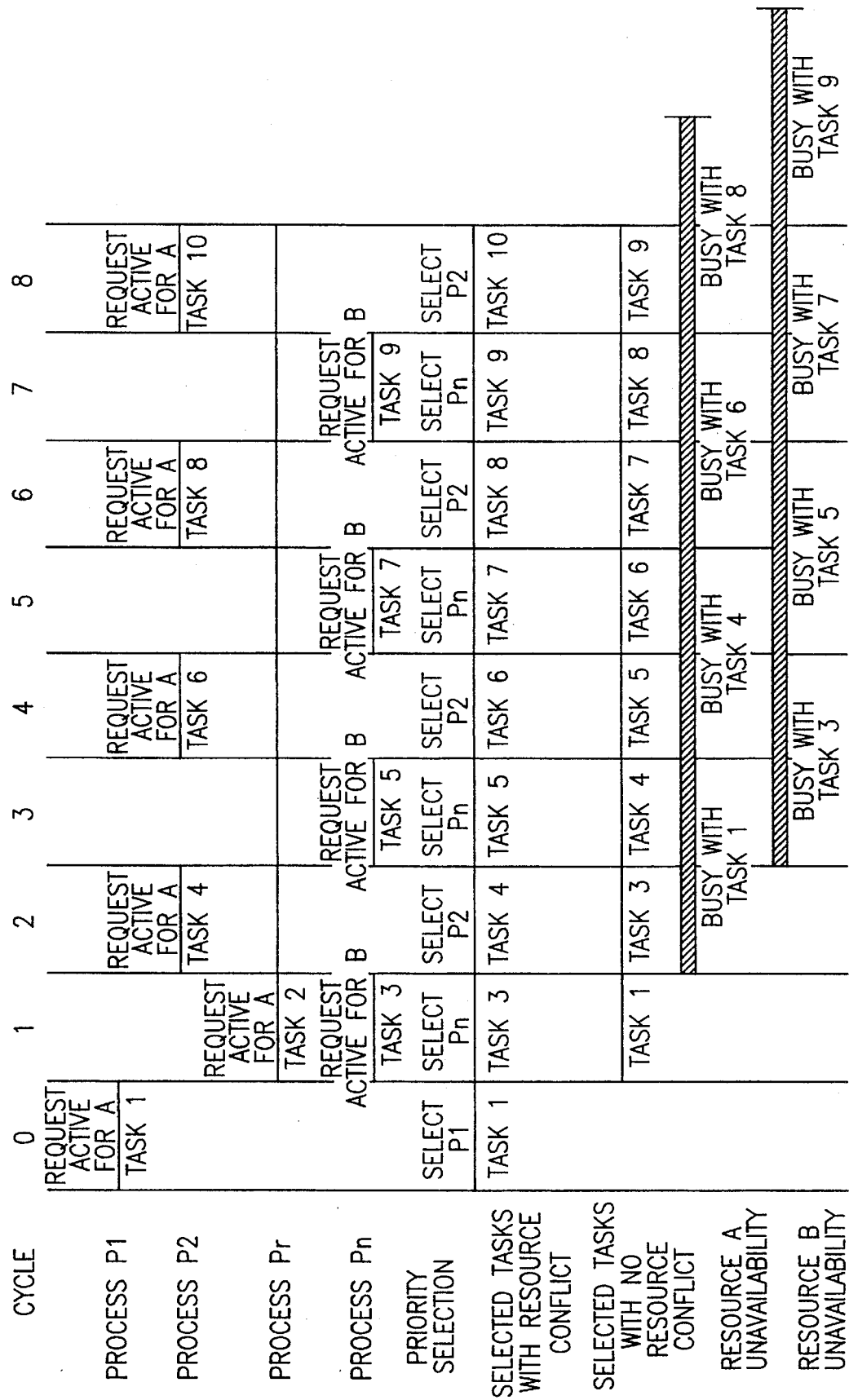
FIG. 2 illustrates operation of round robin priority selection logic with resource checking in accordance with the invention.

FIG. 2 illustrates operation of round robin priority selection logic with resource checking in accordance with the invention. In cycle 0, Process P1 (Task 1) is selected busying Resource A in cycles 2 and 3. The priority token is then updated to point to P1.

In cycle 1, Process Pr (Task 2) is pointed to by the priority token as having the highest priority, but is found to have a conflict with Resource A in cycle 3. Therefore, Process Pn (Task 3), having the next highest priority, is selected. The priority token is updated to point to Pn.

In cycle 2, Process P2 (Task 4) is pointed to by the priority token as highest priority, and is selected as no conflict is detected for Resource A in cycle 4. Resource A is busied in cycles 4 and 5. The priority token is updated to point to P2.

In cycle 3, Process Pr (Task 2) is pointed to by the priority token as having the highest priority, but is found to have a conflict with Resource A in cycle 5. Therefore, Process Pn (Task 5), having the next highest priority, is selected. The priority token is updated to point to Pn.

In cycle 4, Process P2 (Task 6) is pointed to by the priority token as highest priority, and is selected as no conflict is detected for Resource A in cycle 6. Resource A is busied in cycles 6 and 7. The priority token is updated to point to P2.

In cycle 5, Process Pr (Task 2) is pointed to by the priority token as highest priority, but is found to have a conflict with Resource A in cycle 7. Therefore, Process Pn (Task 7) having the next highest priority is selected. The priority token is updated to point to Pn.

In cycle 6, Process P2 (Task 8) is pointed to by the priority token as highest priority, and is selected as no conflict is detected for Resource A in cycle 8. Resource A is busied in cycles 8 and 9. The priority token is updated to point to P2.

In cycle 7, Process Pr (Task 2) is pointed to by the priority token as highest priority, but is found to have a conflict with Resource A in cycle 9. Therefore, Process Pn (Task 9) having the next highest priority is selected. The priority token is updated to point to Pn.

In cycle 8, Process P2 (Task 10) is pointed to by the priority token as highest priority, and is selected as no conflict is detected for Resource A in cycle 10. Resource A is busied in cycles 10 and 11. The priority token is updated to point to P2.

It may be appreciated that with resource checking, the possibility of rejects due to resource conflicts is eliminated. This reduces the number of idle cycles experienced by the resources. Notice in FIG. 2 that resources A and B are kept constantly busy with valuable work. It can also be appreciated that with resource checking there exists the possibility that the round robin priority selection logic will skip over a process request that has a resource conflict and, by the time the selection logic returns to that process, there may be another conflict requiring the process request to again be skipped. Thus, adding resource checking to the standard round robin priority selection logic presents the possibility of a lockout situation for a process request.

Figure 3:
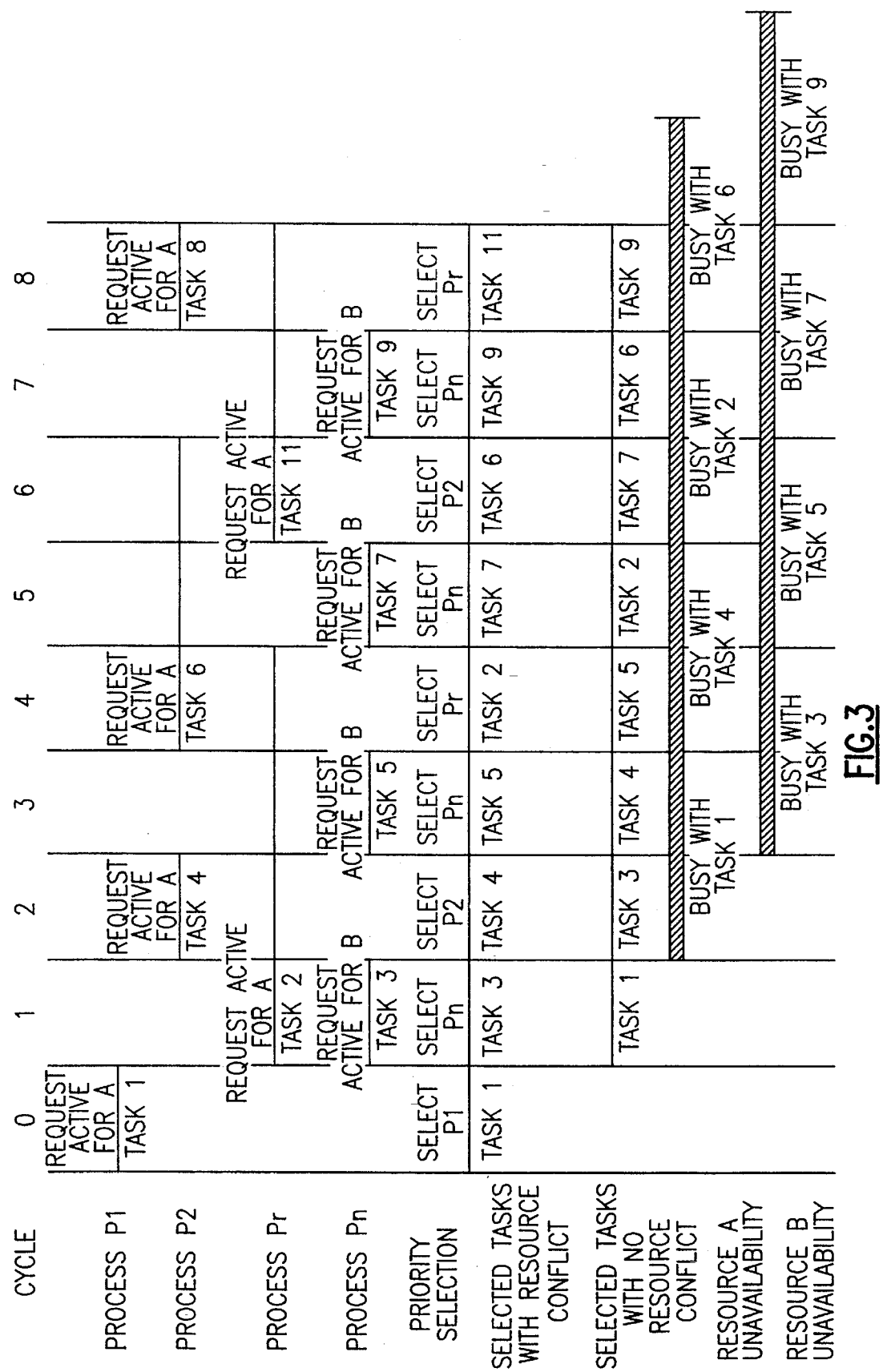
FIG. 3 illustrates operation of round robin priority selection logic with resource checking and lockout avoidance in accordance with the invention.

FIG. 3 illustrates operation of round robin priority selection logic with resource checking and lockout avoidance. In cycle 0, Process P1 (Task 1) is selected busying Resource A in cycles 2 and 3. The priority token is then updated to point to P1.

In cycle 1, Process Pr (Task 2) is pointed to by the priority token as having the highest priority, but is found to have a conflict with Resource A in cycle 3. Therefore, Process Pn (Task 3) having the next highest priority is selected. The priority token is not updated.

In cycle 2, Process P2 (Task 4) is pointed to by the priority token as having the highest priority, and is selected as no conflict is detected for Resource A in cycle 4. Resource A is busied in cycles 4 and 5. The priority token is updated to point to P2.

In cycle 3, Process Pr (Task 2) is pointed to by the priority token as having the highest priority, but is found to have a conflict with Resource A in cycle 5. Therefore, Process Pn (Task 5) having the next highest priority is selected. The priority token is not updated.

In cycle 4, Process Pr (Task 2) is pointed to by the priority token as having the highest priority, and is selected as no conflict is detected for Resource A in cycle 6. Resource A is busied in cycles 6 and 7. The priority token is updated to point to Pr.

In cycle 5, Process Pn (Task 7) is pointed to by the priority token as having the highest priority, and is selected as no conflict is detected for Resource B in cycle 7. The priority token is updated to point to Pn.

In cycle 6, Process P2 (Task 6) is pointed to by the priority token as having the highest priority, and is selected as no conflict is detected for Resource A in cycle 8. Resource A is busied in cycles 8 and 9. The priority token is updated to point to P2.

In cycle 7, Process Pr (Task 11) is pointed to by the priority token as having the highest priority, but is found to have a conflict with Resource A in cycle 9. Therefore, Process Pn (Task 9) having the next highest priority is selected. The priority token is not updated.

In cycle 8, Process Pr (Task 11) is pointed to by the priority token as having the highest priority, and is selected as no conflict is detected for Resource A in cycle 10. Resource A is busied in cycles 10 and 11. The priority token is updated to point to Pr.

It may be appreciated that with resource checking and the token update algorithm, in accordance with the invention, the possibility of rejects due to resource conflicts is eliminated (similar to the benefits as described above with FIG. 2). In addition, the possibility of lockout due to skipping over the process with conflicts is also eliminated. This allows for the performance advantage without the added risk of lockout.

Figure 4:
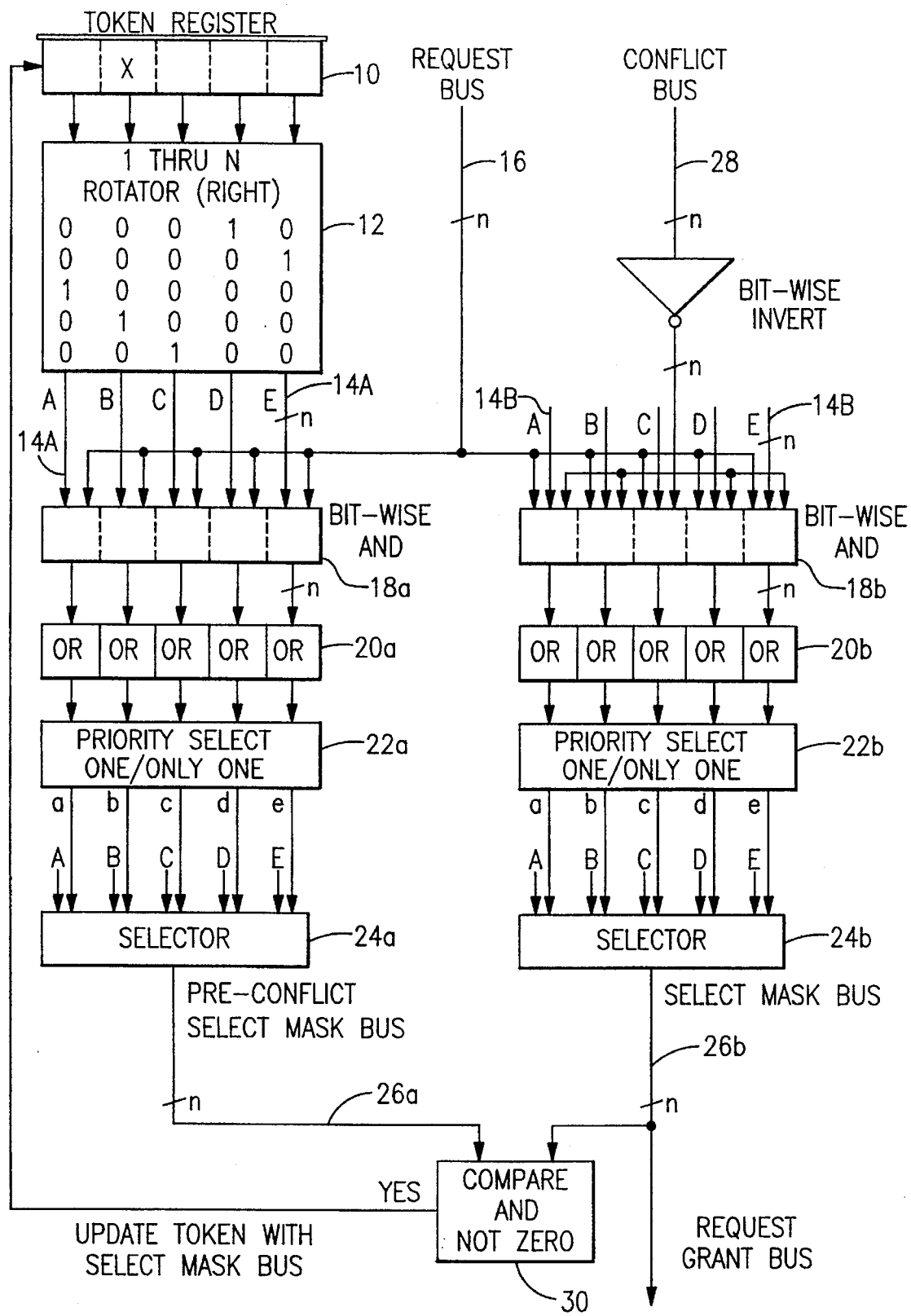
FIG. 4 illustrates implementation of round robin priority selection logic with resource checking and lockout avoidance in accordance with the invention.

FIG. 4 illustrates an implementation of round robin priority selection logic with resource checking and lockout avoidance in accordance with the invention. A token register 10 is provided including a position for each of n process requests, as shown n is equal to five. The token register is connected to rotator logic circuit 12 which represents the token register shifted-by-1, shifted-by-2, shifted-by-3, . . . shifted-by-n. The rotator logic circuit establishes the priorities of the process requests and may be implemented either in hardwired logic or in a shuffle network. In the example shown in FIG. 4, the highest-priority mask is designated "A", second-highest-priority mask "B", and similarly on down to the lowest-priority mask "E".

An n-bit request bus 16 (one bit per requestor) is provided with each bit corresponding to the token register (a "1" indicates that a request is asking for priority). A conflict bus (one bit per requestor) is also provided with each bit representing the conflict status of that process request (a "1" indicating that a conflict is present).

Each shifted priority bus 14a is bit-wise ANDed 18a with the request bus 16. The results are then ORed 20a together to form corresponding bits on the resulting n-bit bus. A "1" in the ith bit indicates that the ith priority process request is requesting priority. The result is then sent into a priority select one-and-only-one logic circuit 22a. The priority select one-and-only-one logic circuit may be created using combinatiorial logic where the ith bit is used to degate the (i+1)th and greater bits for all bits.

The result is an n-bit bus with one-and-only-one bit on. The bus represents which process request has the highest priority. For example, if the first two process requests by priority are not active and the third process request is active, the third bit will be on.

This one-and-only-one bus feeds the controlling input of a selector 24a. The selector is used to select the rotate bus corresponding to the ith bit requested creating a pre-conflict select mask bus 26a. The pre-conflict select mask bus represents which process request would have priority if there were no resource conflicts corresponding to that process request. If the one-and-only-one logic returns a bus of all zeros, the output of the selector should also be forced to zero.

The right side of the FIG. 4 represents similar logic as the left side of the figure, except that the conflict bus 28 is used to ignore the process requests which have pipe conflicts. The select mask bus 26b then represents which process request will actually get priority, taking into account the conflicts. The select mask will be used for the request grant into the pipeline.

The pre-conflict select mask bus 26a and the select mask bus 26b are then compared 30. If they are different, the token register 10 is not updated. Optionally, it can be set to the value of the pre-conflict select mask bus shifted "LEFT" by one. If the pre-conflict select mask bus and the select mask bus are the same, then the token register is updated to match the select mask bus.

In view of the foregoing, it will be appreciated that the round robin priority selection logic with resource checking and lockout avoidance in accordance with the invention provides improved system performance by allowing the resource arbitration logic to handle process requests with a higher probability of success, resulting in less rejects and increased system throughput.

While the invention has been described in its preferred embodiments, it is to be understood that the words which have been used are words of description, rather than limitation, and that changes may be made within the purview of the appended claims without departing from the true scope and spirit of the invention in its broader aspects.

What is claimed:

1. A method of resource arbitration for a plurality of process requests in a system priority queue, comprising the steps of:
   setting a token corresponding to a process having the highest priority in the queue;
   selecting a process request for a system resource from said plurality of process requests based upon the setting of said token;
   determining availability of said requested system resource for said selected process request;
   if said requested system resource is available, granting said process request for said requested system resource and updating the token setting to another process in the queue; and
   if said requested system resource is unavailable, selecting a process request for a system resource from the priority queue and updating the token setting to a process request in the queue to avoid lockout.

2. A method of resource arbitration in accordance with claim 1, wherein said step of selecting a process request includes using a round robin selection procedure.

3. A method of resource arbitration in accordance with claim 1, wherein if said requested system resource is unavailable the token setting is not updated.

4. An apparatus for resource arbitration for a plurality of process requests in a system priority queue, comprising:
   a token register storing a token corresponding to a process having the highest priority in the queue;
   a first electronic circuit that selects a process request for a system resource from said plurality of process requests based upon the setting of said token in said token register;
   a second electronic circuit that determines the availability of said requested system resource for said selected process request from said first electronic circuit; and
   a third electronic circuit that either grants said process request for said requested system resource and updates the token setting to another process in the queue or selects another process request for a system resource from the priority queue and updates the token setting to a process request in the queue to avoid lockout based upon the availability determination made by said second electronic circuit.

5. An apparatus for resource arbitration in accordance with claim 4, wherein said first electronic circuit implements a round robin selection procedure.

6. An apparatus for resource arbitration in accordance with claim 4, wherein if said requested system resource is unavailable the token setting is not updated.

7. An apparatus for resource arbitration for a plurality of process requests in a system priority queue, comprising:
   means for setting a token in a token register corresponding to a process having the highest priority in the queue;
   means for selecting a process request for a system resource from said plurality of process requests based upon the setting of said token in said token register;
   means for determining availability of said requested system resource for said process request from said means for selecting a process request;
   means for granting said process request for said requested system resource and updating the token setting to another process in the queue if said requested system resource is available; and
   means for selecting another process request for a system resource from the priority queue and updating the token setting to a process request in the queue to avoid lockout if said requested system resource is unavailable.

8. An apparatus for resource arbitration for a system priority queue in accordance with claim 7, wherein said means for selecting a process request further includes means for implementing a round robin selection procedure.

9. An apparatus for resource arbitration for a system priority queue in accordance with claim 7, wherein if said requested system resource is unavailable the token setting is not updated.

* * * * *